US012653106B2

(12) United States Patent (10) Patent No.: US 12,653,106 B2

Springer (45) Date of Patent: Jun. 16, 2026

(54) ROTARY TEDDER HAVING A LIFTING UNIT

(71) Applicant: CNH Industrial America LLC, New Holland, PA (US)

(72) Inventor: Klaus Springer, Tyskland (DE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 612 days.

(21) Appl. No.: 17/973,917

(22) Filed: Oct. 26, 2022

(65) Prior Publication Data

US 2023/0127688 A1 Apr. 27, 2023

(30) Foreign Application Priority Data

Oct. 26, 2021 (EP) ..................................... 21204838

(51) Int. Cl.
  *A01D 78/10* (2006.01)
  *A01B 73/04* (2006.01)
(52) U.S. Cl.
  CPC ........ *A01D 78/1014* (2013.01); *A01B 73/044* (2013.01)
(58) Field of Classification Search
  CPC ........... A01D 78/1014; A01D 78/1007; A01D 43/04; A01D 2075/203; A01B 73/044

(Continued)

(56) References Cited

U.S. PATENT DOCUMENTS 3,700,043 A * 10/1972 Sullivan ................. A01B 63/16
                                                        172/485
4,046,203 A * 9/1977 Ward ................... A01B 73/044
                                                        172/657

(Continued)

FOREIGN PATENT DOCUMENTS

DK          177196 B1 * 5/2012 ......... A01D 78/1007
EP          310532 A * 4/1989 ............. A01D 75/20

(Continued)

OTHER PUBLICATIONS

EP Application No. 21204838.3, Search Report dated Mar. 23, 2022, 2 pgs.

(Continued)

*Primary Examiner* — Joseph M Rocca
*Assistant Examiner* — Sunny D Webb
(74) *Attorney, Agent, or Firm* — Fletcher Yoder, P.C.

(57) ABSTRACT

An agricultural implement includes a main frame attachable to a towing vehicle, a wheel support supporting the main frame and having main wheels, and a lifting unit configured to bring the agricultural implement into each of a transport position, a working position, and a headland position. The wheel support and the tedder frame are each pivotable around a common axle on the main frame, the lifting unit includes an adjustment assembly attached directly to the wheel support at a first attachment point and directly to the tedder frame at a second attachment point, the first attachment point and the second attachment point span the common axle and form a triangle therewith, and the lifting unit is configured to pivot the tedder frame and the wheel support around the common axle to bring the agricultural implement into a predetermined position between the working position and the headland position.

9 Claims, 3 Drawing Sheets

(58) Field of Classification Search

USPC .......................... 56/367, 370, 365, 374, 397

See application file for complete search history.

(56) References Cited

U.S. PATENT DOCUMENTS

| | | | | |
|---|---|---|---|---|
| 4,047,575 | A | * | 9/1977 | Wagner ................. A01B 73/044 |
| | | | | 172/414 |
| 4,232,747 | A | * | 11/1980 | Pfenninger .......... A01B 73/044 |
| | | | | 172/311 |
| 5,918,451 | A | * | 7/1999 | Vonesch ............. A01D 78/1007 |
| | | | | 56/367 |
| 5,921,325 | A | * | 7/1999 | Meek ................... A01B 73/044 |
| | | | | 172/311 |
| 5,953,894 | A | * | 9/1999 | Aron .................. A01D 78/1014 |
| | | | | 56/367 |
| 9,877,422 | B2 | * | 1/2018 | Van Den Engel ..... A01B 73/02 |
| 2014/0102069 | A1 | | 4/2014 | Van Den Engel et al. |
| 2020/0323142 | A1 | * | 10/2020 | Riedel ................ A01D 78/1085 |

FOREIGN PATENT DOCUMENTS

| | | | | | |
|---|---|---|---|---|---|
| EP | 1050205 | A1 | * | 11/2000 | ......... A01D 78/1014 |
| EP | 1275292 | A1 | * | 1/2003 | ............. A01B 63/32 |
| EP | 2436260 | A1 | * | 4/2012 | ......... A01D 78/1014 |
| EP | 2499897 | | | 9/2012 | |
| EP | 2499897 | A1 | * | 9/2012 | ......... A01D 78/1014 |
| EP | 2591663 | A1 | * | 5/2013 | ......... A01D 78/1014 |
| EP | 3245857 | A1 | * | 11/2017 | ............. A01D 80/00 |
| FR | 2618045 | A1 | * | 1/1989 | ......... A01D 78/1014 |
| JP | S57167612 | U | | 10/1982 | |
| JP | S63160503 | A | | 7/1988 | |

OTHER PUBLICATIONS

EP Application No. 21204838.3, Written Opinion dated Apr. 4, 2022, 8 pgs.

* cited by examiner

ROTARY TEDDER HAVING A LIFTING UNIT

CROSS-REFERENCE TO RELATED APPLICATION

This application claims priority from and the benefit of EP Application Serial No. 21204838.3, entitled "Rotary Tedder", filed Oct. 26, 2021, which is hereby incorporated by reference in its entirety.

FIELD OF THE INVENTION

The present invention relates to an agricultural implement, preferably a rotary tedder or hay-making machine for turning crops lying on an agricultural field. Agricultural implements of this type comprise a main frame attachable to a towing vehicle, a wheel support supporting the main frame and having a plurality of main wheels, a plurality of tedder units supported on a tedder frame, and a lifting unit configured for bringing the implement into one of a transport position, a working position and a headland position.

Large haymaking machines with working widths of more than 10 meters usually comprise a plurality of rotary tedder units running in a parallel line which is transverse to a direction of travel of the towing vehicle. These rotary tedder units are supported on the tedder frame which is pivotably attached to the main frame in a fashion such that the tedder units may be lifted sufficiently above ground in a headland position such that the working direction of the towing vehicle may be altered. The tedder frame including the rotary tedder units may further be lifted and/or folded onto the main frame when in a transport position for road transport. In some countries the dimensions of an agricultural implement in road transport position must not significantly exceed a width of 3 m and a height of 4 m.

An important aspect in such haymaking machines is the adaption of the tedder units to the uneven ground surface transversely to the direction of travel of the towing vehicle. In order to achieve an optimal result through ground adaption the tedder frame is regularly divided into several sections of predetermined width which are hingedly connected with each other along a horizontal pivot axis extending substantially in the direction of travel.

To be able to lift the tines of the tedder units from the ground, either in a working position where the height of the tines above ground shall be adjusted, or in the headland position where all tedder units must be lifted significantly above the ground surface to enable a smooth and safe turning, several technical concepts are known.

EP 2 499 897 A1 discloses a haymaking machine having a main frame supported on a chassis, a plurality of haymaking units supported at a support frame and a lifting apparatus configured to lift the support frame together with the haymaking units relative to the main frame into a working position, a headland position and a travel position. This is achieved by providing an intermediate frame provided between the main frame and the support frame, the intermediate frame being pivotally connected to the main frame about a first horizontal transverse axle and being pivotally connected to the support frame about a second horizontal transverse axle. The structure of the haymaking machine in EP 2 499 897 A1 is rather complex from a mechanical point of view and requires relatively high maintenance and handling effort.

SUMMARY OF THE INVENTION

It is the object of the present invention to provide an agricultural implement, such as a tedder, which improves at least some of the shortcomings of the prior art. In particular, the improved agricultural implement shall provide a simple structure and a reliable function when changing from the working position, the headland position and the transport/travel position into any of the remaining positions. Further, an unwanted touching of the ground surface by the tines and thus an undesirable destruction of the ground and the used material shall be avoided.

According to an aspect of the invention, an agricultural implement, preferably a tedder, may comprise a main frame attachable to a towing vehicle, a wheel support supporting the main frame and having a plurality of main wheels, a plurality of tedder units supported on a tedder frame, the tedder units each having a plurality of tines, a lifting unit configured for bringing the implement into one of a transport position, a working position and a headland position, wherein the wheel support and the tedder frame are separate elements, each pivotable around the common axle on the main frame, wherein the lifting unit comprises an adjustment assembly being attached to the wheel support at a first attachment point and to the tedder frame at a second attachment point, the adjustment assembly thereby spanning the common axle and forming a triangle therewith, wherein the lifting unit further comprises guiding means on the tedder frame, and wherein the lifting unit is configured to pivot the tedder frame and the wheel support around the common axle thereby bringing the implement into a predetermined position between the working position and the headland position.

This simple structure is relatively easy to assemble and to maintain and offers a reliable function of the agricultural implement. The fact that there is no second pivot axis nor any additional frame element simplifies the overall construction and the handling and requires less maintenance effort. This is achieved by the boogie-like triangular arrangement of the adjustment assembly with the common axle wherein the first attachment point, the second attachment point and the adjustment assembly form a triangle with the adjustment assembly having an adjustable length representing the side of the triangle opposite the common axle. Furthermore, it enables a fast and higher lifting of the tedder units, and the wheel support and tedder frame act as a rigid unit comparable to a boogie wheel chassis. Obtaining the predetermined position between the working position and the headland position offers a possibility for the operator to adjust the height of the tines above ground without having to actuate the central actuators but only the adjustment actuators of the lifting unit.

In a preferred embodiment the predetermined position between the working position and the headland position may include a position in which the tines of the tedder unit are lifted above ground and tedder wheels of the tedder unit remain on ground. In this predetermined position, the tines of each tedder unit have been lifted so that their distance to the ground surface is sufficient for not destroying the surface and for not damaging the tines. It is noted that this predetermined position may be achieved by minimally actuating the components of the adjustment assembly, i.e. by avoiding that any major hydraulic components of the agricultural implement except the components of the adjustment assembly are actuated. It should also be noted that the predetermined position can also be the working position or the headland position, i.e. that both end positions are included in the range.

According to another advantageous embodiment the tedder frame may comprise a guiding portion having a long hole as guiding means. The long hole as part of the guiding means on the tedder frame is easy to manufacture, to maintain and to monitor. Here, the guiding means fulfills the important function that surface inequalities over the entire width of the tedder units can be compensated without changing the settings of or operating any of the actuators on the implement. This is due to the fact that the tedder frame and the wheel support are configured to be pivotable around the common axle provided on the main frame. This structure thus enables a smooth compensation of ground surface inequalities across the tedder width.

In a further embodiment the adjustment assembly may be configured to adjust the relative position of the wheel support with respect to the tedder frame. This enables the relative movement of the wheel support with respect to the tedder frame around the common axle independent of any other actuators of the lifting unit. For example, the height of the tines of the tedder unit may be adjusted by actuating at least one adjustment actuator of the adjustment assembly. This may be performed while the tedder wheels and also the support wheels are on the ground, either manually or by means of an automatically actuated device.

According to another aspect, the adjustment assembly may comprise at least one adjustment actuator.

According to a further preferred embodiment, the implement may comprise at least one central actuator connected with the guiding means on the tedder frame wherein the at least one central actuator is configured for supporting to bring the implement into and out of the transport position. As the travel range of the at least one central actuator may be much larger than the travel range of the at least one adjustment actuator the entire tedder frame comprising the tedder units may be lifted fully and quickly such that the transport position is reached. In this embodiment, the connection point of the at least one central actuator within the guiding means will be at a mechanical stop position such that the tedder frame can directly be lifted towards the transport position or out of the transport position. It is also preferred in this embodiment that actuating the at least one central actuator will pivot the lifting unit around the common axle while keeping the relative position of the wheel support with respect to the tedder frame unchanged. This structure adds to the stability of the tedder frame and therefore of the overall agricultural implement. In other words, the fact that the wheel support and the tedder frame act as a boogie chassis enhances the ground surfaced compensation capabilities.

In an advantageous embodiment the adjustment assembly may comprise a hydraulic actuator and/or a manual spindle. With a manual spindle, the tine height of the tedder units may be easily adjusted by an operator of the agricultural implement, e.g. immediately on the field. Alternatively or in addition, a hydraulic actuator may be operated to adjust the relative position of the wheel support and the tedder frame. Here it is noted that the lifting unit with the adjustment assembly is responsible for setting and/or adjusting the relative position of the wheel support and the tedder frame, or in other words the relative position of the main wheels and the tedder units.

In other embodiments, the at least one central actuator may comprise at least one hydraulic actuator, preferably two hydraulic actuators. The first hydraulic actuator may be one with a large travel range for quickly rising and lowering the tedder frame towards and out of the transport position, and the second hydraulic actuator may be one with a smaller travel range, e.g. for lifting or lowering the tedder frame into and out of the headland position.

According to the previously mentioned embodiments, the control of the adjustment assembly and/or the at least one central actuator may be performed remotely by the towing vehicle. In this regard, a central control unit on the towing vehicle connected with each of the actuators may initiate the actuation of those elements.

In a further embodiment, the implement may comprise sensing means configured to sense the position of the tedder units and/or the ground clearance of at least one of the plurality of tedder units. In addition, the implement may include sensing means configured to sense the position of the main wheels and/or the ground clearance of the common axle. The sensing means may advantageously be connected with a central control unit located on the towing vehicle such that the position of the tedder frame, the tedder units, the tedder wheels or the tines of each tedder unit may be monitored by an operator in the towing vehicle. Optionally, the control unit may issue alarm signals in case any of predetermined threshold values of the previously mentioned positions are exceeded. Furthermore, it is preferred that the control unit of the towing vehicle may initiate countermeasures, i.e. signals to the actuators on the agricultural implement such that the position of the tedder frame, tedder units, tedder wheels or tines etc. may be corrected.

DETAILED DESCRIPTION OF SPECIFIC EMBODIMENTS

Figure 1:
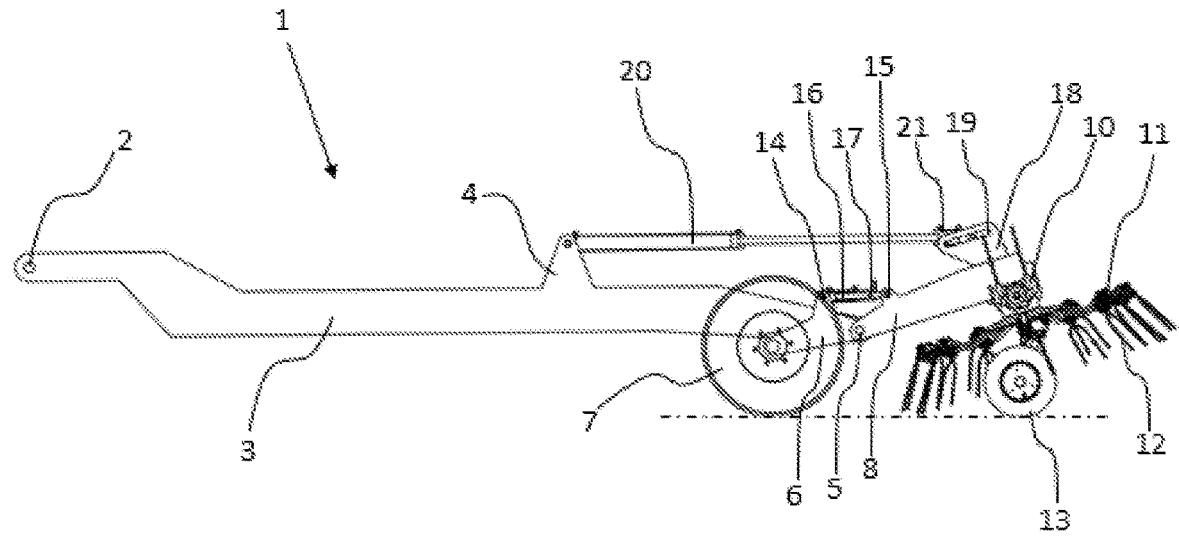
FIG. 1 is a side view of a preferred embodiment of the agricultural implement according to the invention in the working position.
Figure 2:
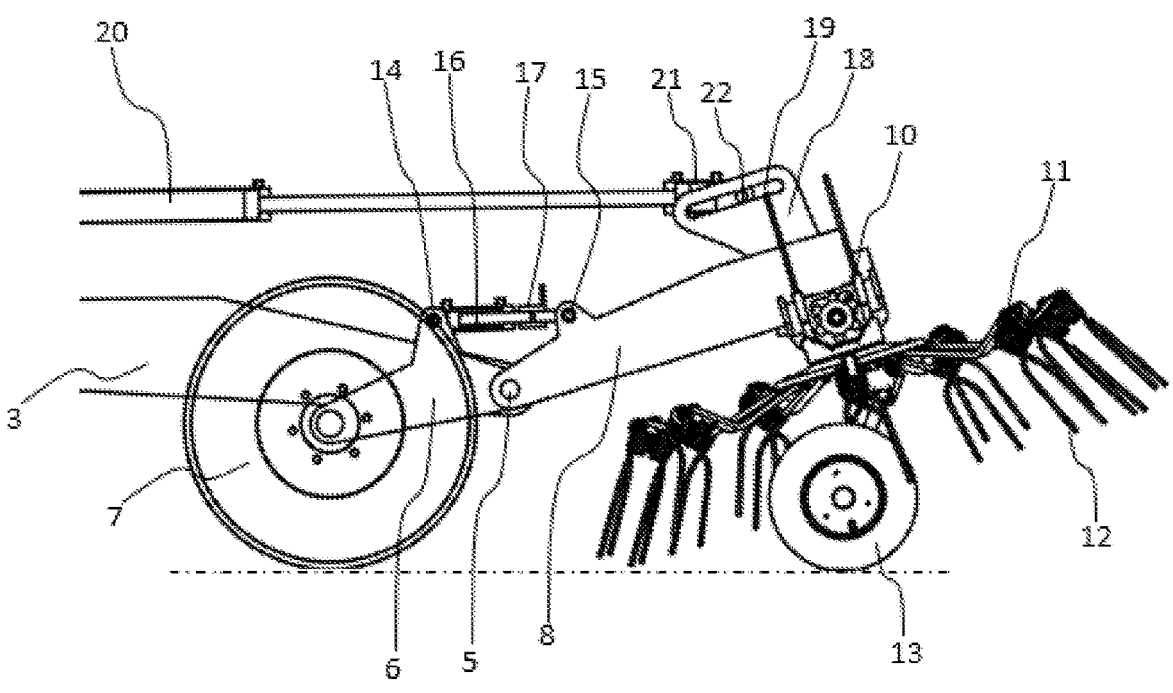
FIG. 2 is a detailed side view of the main components shown in the embodiment of FIG. 1.

FIGS. 1 and 2 show a side view of a preferred embodiment of the agricultural implement according to the invention in the working position. The agricultural implement may be a tedder 1 having a main frame 3 which can comprise on one end a tow hook or tow ring 2 configured to engage with the tow hitch of a towing vehicle (not shown) and on the other end a common axle 5 configured for attaching a wheel chassis and a plurality of tedder units as will be explained below. Between the two ends a mounting portion 4 may be provided at which at least one central actuator may be attached which will also be explained in detail below.

In this embodiment, two components may be pivotably attached to the common axle 5: a wheel support 6 having a main wheel 7 rotatably attached on either side of the agricultural implement 1, and the tedder frame 8 to which the plurality of tedder units 10 may be attached. Each tedder unit 10 may essentially comprise a rotary rake 11 having a plurality of forks or tines 12 which are configured to move, swath or otherwise distribute freshly cut hay or other crop on a field. The plurality of tedder units 10 may in the present embodiment be distributed on the tedder frame 8 transversely to the driving direction of the agricultural implement one such that on either side of the main frame 3 an equal number of tedder units 10 covers an area as wide as possible. In the transverse direction, the tedder frame 8 may comprise side portions, hinges and drives which are configured to enable a folding of tedder units 10 onto the tedder frame 8 and to supply energy to drive the rotary rakes 11. Furthermore, a plurality of tedder wheels 13 may be positioned along the width of the tedder frame 8, preferably one tedder wheel 13 per tedder unit 10.

The drive for rotatably driving the rotary rakes 11 may, for example, be designed with drive shafts which are propelled by the PTO of the towing unit.

In the working position shown in FIG. 1, the side parts of the tedder frame 8 are fully extended and articulated in such a way that ground surface inequalities such as bumps and the like may be compensated. In addition to the pivoting motion of the side portions of the tedder frame 8, the tedder units have a further degree of freedom by rotating the tedder frame 8 in relatively small ranges around the common axle 5.

To this end, the wheel support 6 and the tedder frame 8 are advantageously connected in a common axle 5 as mentioned above. Furthermore, those two components are connected by an adjustment assembly which is located between a first attachment point on the wheel support 6 and a second attachment point on the tedder frame 8. In the shown embodiment, the first attachment point may be a first pivot axis 14 which is attached to the wheel support 6 at a central portion thereof, and the second attachment point may be a second pivot axis 15 located on an attachment portion of the tedder frame 8 which is positioned towards the common axle 5. Arranged between the first pivot axis 14 and the second pivot axis 15 may be a rod having a first adjustment actuator 16 and a second adjustment actuator 17, all these elements thereby forming the adjustment assembly in this embodiment. In the present embodiment, the first adjustment actuator 16 may be a hydraulic cylinder 16 and the second adjustment actuator 17 may be a manual spindle apparatus 17. The hydraulic cylinder 16 may be powered by a hydraulic line connected with the towing vehicle.

The first and second adjustment actuators 16, 17 together with the rod form the adjustment assembly also as a part of a lifting unit which is configured to set and/or adjust the relative position of the wheel support 6 with respect to the tedder frame 8. In other words, the setting of the adjustment actuators determines the length or distance between the first pivot axis 14 and the second pivot axis 15 such that the wheel frame 6 and the tedder frame 8 form a rigid unit acting like a boogie chassis which may pivot around the common axle 5. It is understood that when the distance between the first pivot axis 14 and the second pivot axis 15 is shortened and the relative position between the main frame 3 and the wheel support 6 is not changed, then the tedder frame 8 pivots slightly around the common axle 5 such that its free portion is lifted relative to the wheel support 6 having the wheels 7 which rest on the ground surface.

However, the movement of the tedder frame 8 triggered by operating one or more of the at least one adjustment actuator 16, 17 is limited by a structure which is a part of the tedder frame 8: a guiding portion 18 may be included in the tedder frame 8, the guiding portion 18 being configured to guide and limit the movement of the tedder frame 8 by being connected to at least one central actuator. It is noted that the guiding portion 18 may be integral with the tedder frame 8 or may be a separate component attached to the tedder frame.

In the shown embodiment, the at least one central actuator may comprise a first central actuator 20 and a second central actuator 21 both acting on a rod extending between the mounting portion 4 of the main frame 3 and the guiding portion 18 of tedder frame 8. In other embodiments, the at least one central actuator may include a single central actuator, preferably a hydraulic cylinder which, in combination with a position detection unit, can be actuated as needed.

A long hole 19 may be arranged as part of the guiding portion 18 wherein a guiding pin 22 formed on one end of the rod is accommodated within the long hole 19. Therefore, the movement of the tedder frame 8 is restricted by the movement of the guiding pin 22 within the long hole 19. This limitation of movement has several effects which will be explained below.

A first, predetermined movement of the guiding pin 22 within the long hole 19 is achieved by changing the extension of any of the adjustment actuators 16, 17 or central actuators 20, 21. As mentioned above, the predetermined movement of the second adjustment actuator 17 which may be a manual spindle handled by the operator of the implement effects an adjustment of the height of the tines 12 of every tedder unit 10. Looking at FIG. 2, for example, ex-tending the length between the first pivot axis 14 and the second pivot axis 15 will lift the tines 12 of every tedder unit 10 on the forward side of the tedder wheel 13, i.e. where the tines 12 are intended to engage with the crop lying on the ground surface. In a similar fashion, de-creasing the length between the first pivot axis 14 and the second pivot axis 15 will move the tines 12 of the tedder units 10 between the main wheel 7 and the tedder wheel 13 closer to the ground surface, i.e. the angle of the plane of rotation of the tedder units 10 with respect to the ground surface will increase.

On the other hand, a second, independent movement of the entire wheel support/tedder frame combination may occur when the agricultural implement 1 is pulled over an even ground surface. For example, the main wheel 7 may impinge on a stone or rock on the ground surface such that it is slightly lifted. As there is a rigid, boogie-like structure consisting of the wheel support 6 having the main wheel 7 and the tedder frame 8 having the tedder units 10 with the tedder wheels 13, the lifting of the main wheel 7 will effect a pivoting movement of the rigid structure about the common axle 5. This is enabled by the limited, but possible movement of the guiding pin 22 within the long hole 19. Within the range of travel of the guiding pin 22 in the long hole 19 there is thus a possibility of a tilting movement of the boogie-like structure such that uneven ground surface passages may be compensated without exerting any forces on the main frame 3.

Figures 3, 4:
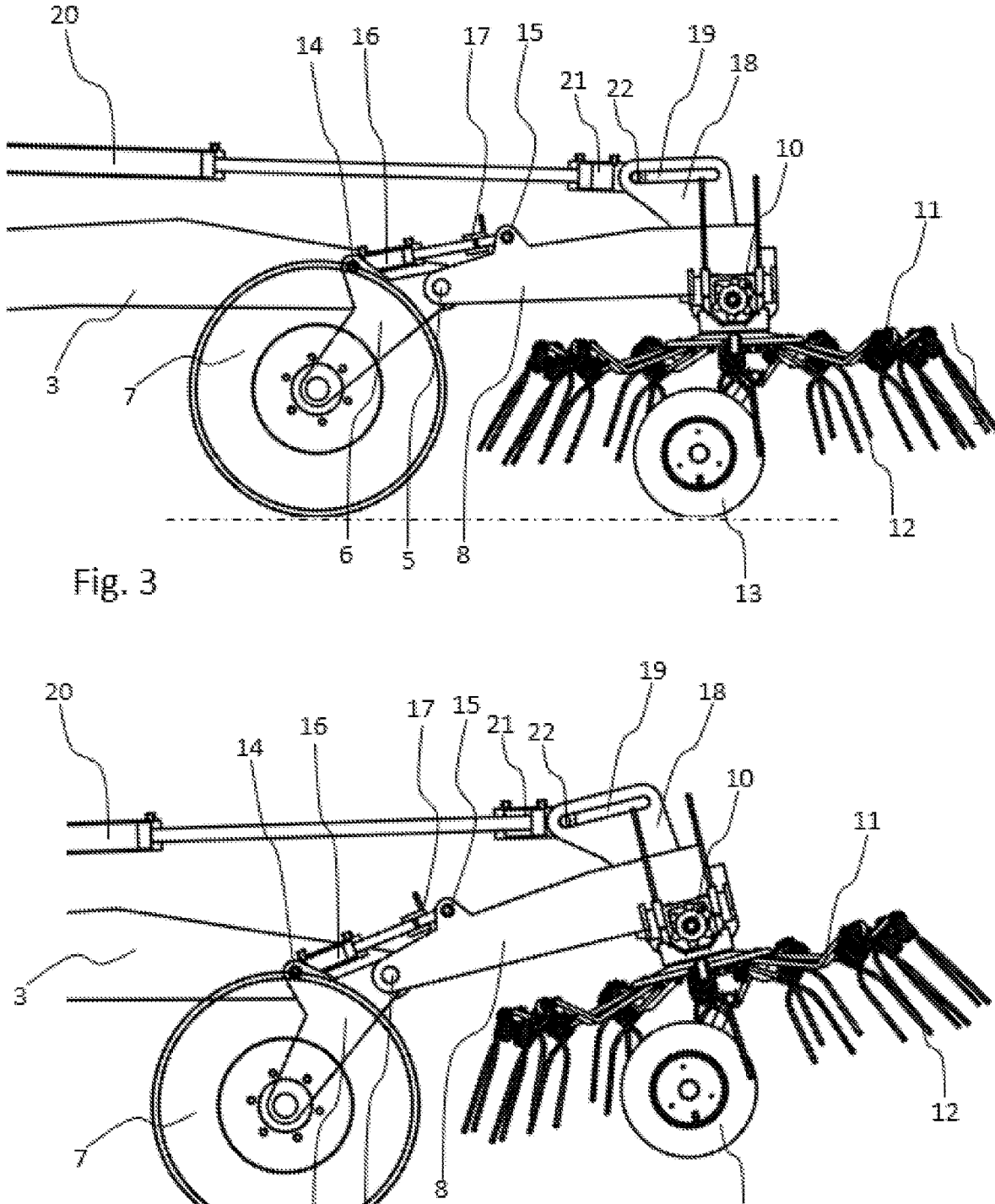
FIG. 3 is a detailed side view of the main components in FIG. 1 in an intermediary position.
FIG. 4 is a detailed side view of the main components in FIG. 1 in a headland position.

FIG. 3 shows a side view of the embodiment of FIGS. 1 and 2 in an intermediary position where the tines 12 of the tedder units 10 have been lifted above the ground surface. This predetermined or intermediary position was achieved by extending the distance between the first pivot axis 14 and the second pivot axis 15 by means of the first adjustment actuator 16 and/or the second adjustment actuator 17 of the adjustment assembly. It can clearly be seen in FIG. 3 that the guiding pin 22 within the long hole 19 has reached a first stop position which is the leftmost position in the shown embodiment. Further, the angle between the wheel sup-port 6 and the tedder frame 8 has changed accordingly bringing the main wheel 7 and the tedder wheels 13 slightly closer together. It should be mentioned that in this position, it is no longer possible to extend the distance determined by the adjustment actuators because the guiding pin 22 within the long hole 19 is already in its stop position. However, in other embodiments pin 22 may not be in this stop position when the at least one actuator is extended.

The headland position of the agricultural implement 1 is shown in a side view of FIG. 4. Starting from the intermediary position of FIG. 3, the central actuators 20, 21 or only the central actuator 20 were actuated so as to decrease the length of the rod on which they are located. This causes the tedder frame 8 including the tedder units 10 and the wheel support 6 to be pulled towards the towing unit. As the wheel support and the tedder frame 8 are pivotably attached to the main frame 3 at the common axle 5 the pulling movement of the central actuators 20, 21 effects a pivoting movement of the entire boogie-like structure lifting the tedder wheels 13 from the ground surface. FIG. 4 shows that the angle between the wheel support 6 and the tedder frame 8 remains constant with respect to the intermediary position shown in FIG. 3 but the respective position of the central actuators has changed. In this position, the agricultural implement one can be safely moved in a headland turn such that none of the tedder units 10 may engage with the ground surface. As seen in FIGS. 3 and 4, the height of the tedder units 10 above the ground surface is determined by the adjustment actuators 16, 17 as well as the central actuators 20, 21.

Figure 5:
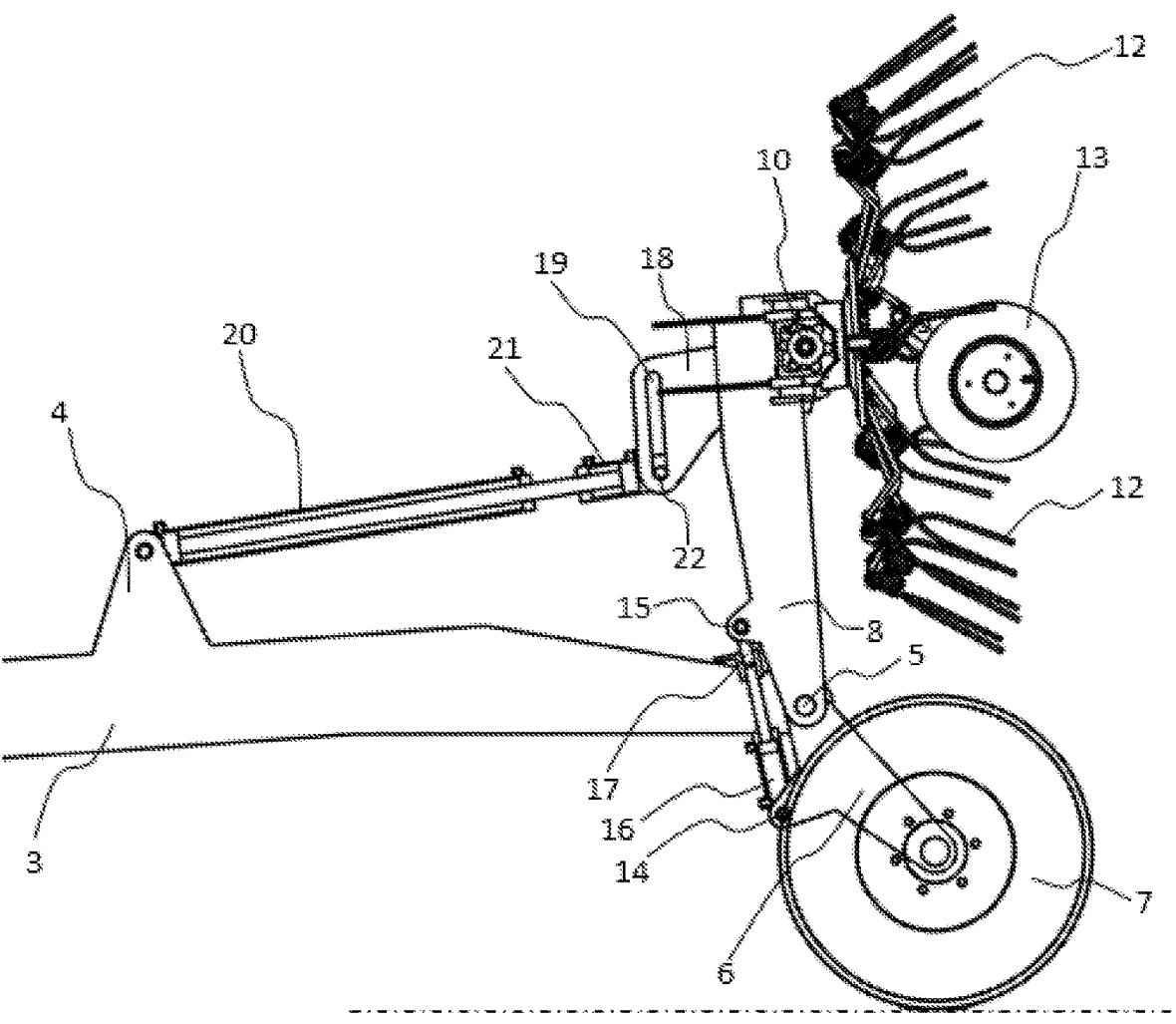
FIG. 5 is a detailed side view of the main components in FIG. 1 in a transport position.

In FIG. 5, the agricultural implement 1 is shown in the transport position. This position starts from the headland position, shown in FIG. 4, in which hydraulic cylinders or other actuators firstly fold the side portions (not shown) of the tedder frame 8 onto one another so that the overall width of the agricultural implement 1 will not exceed its allowed value in the transport position. Then, the central actuator(s) 20, 21 may be actuated, for example by moving the hydraulic cylinder(s) of the actuator(s) to its/their shortest length. This will further pull the ted-der unit portion of tedder frame 8 and causes a further rotational movement of the boogie-like structure around common axle 5 thereby further lifting the tedder units 10 to their substantially full vertical extension in which the rotary rakes are orientated perpendicular to the ground surface. It should be noted that also here, as also shown in the headland position of FIG. 4, the vertical position of the common axle 5 is also slightly lifted due to the length of the wheel frame 6. It can also be seen that the long hole 19 is now orientated vertically, i.e. essentially perpendicular to the central actuators 20, 21. This has the technical effect of locking the ted-der frame 8 rigid to main frame 3.

It is understood that moving from the transport position into any of the other positions follows the reverse order of movement of the respective actuators.

What is claimed is:

1. An agricultural implement, comprising:

a main frame attachable to a towing vehicle, a wheel support supporting the main frame and having a plurality of main wheels;

a tedder unit supported on a tedder frame, the tedder unit having a plurality of tines; and a lifting unit configured to bring the agricultural implement into each of a transport position, a working position, and a headland position;

wherein the wheel support and the tedder frame are separate elements, each pivotable around a common axle on the main frame;

wherein the lifting unit comprises an adjustment assembly, the adjustment assembly being attached directly to the wheel support at a first attachment point and directly to the tedder frame at a second attachment point, the first attachment point and the second attachment point span the common axle and form a triangle therewith;

wherein the lifting unit further comprises a guide on the tedder frame; and wherein the lifting unit is configured to pivot the tedder frame and the wheel support around the common axle to bring the agricultural implement into a predetermined position between the working position and the headland position.

2. The agricultural implement of claim 1, wherein the predetermined position between the working position and the headland position includes a position in which the plurality of tines of the tedder unit are lifted above ground and in which a tedder wheel of the tedder units remains on the ground.

3. The agricultural implement of claim 1, wherein the tedder frame comprises a guiding portion having a long hole as the guide.

4. The agricultural implement of claim 1, wherein the adjustment assembly is configured to adjust a relative position of the wheel support with respect to the tedder frame.

5. The agricultural implement of claim 1, comprising at least one central actuator connected with the guide on the tedder frame, wherein the at least one central actuator is configured to bring the agricultural implement into and out of the transport position.

6. The agricultural implement of claim 5, wherein the least one central actuator is configured to pivot the lifting unit around the common axle while keeping a relative position of the wheel support with respect to the tedder frame unchanged.

7. The agricultural implement of claim 1, wherein the adjustment assembly comprises a hydraulic actuator, a manual spindle, or a combination thereof.

8. The agricultural implement of claim 5, wherein the at least one central actuator comprises one or more hydraulic actuators.

9. The agricultural implement of claim 5, wherein the adjustment assembly, the at least one central actuator, or a combination thereof, is configured to be remotely controlled by the towing vehicle.

* * * * *